United States Patent [19]

Vitsky et al.

[11] Patent Number: 4,926,759

[45] Date of Patent: May 22, 1990

[54] KNOCKDOWN FURNITURE

[76] Inventors: Sally J. Vitsky, 4116 Bromley La., Richmond, Va. 23221; Margaret P. Levine-Umans, 13 Bank St., New York, N.Y. 10014

[21] Appl. No.: 401,421

[22] Filed: Aug. 31, 1989

[51] Int. Cl.⁵ .................................................. A47B 3/00
[52] U.S. Cl. ........................................ 108/111; 24/295; 248/916; 403/252; 403/242; 446/122
[58] Field of Search .............. 108/111; 446/122, 123, 446/109, 111; 248/916; 211/186; 403/242, 252; 24/295, 454

[56] References Cited

U.S. PATENT DOCUMENTS

| | | | |
|---|---|---|---|
| 1,477,255 | 12/1923 | Fritz | 446/109 |
| 1,518,839 | 12/1924 | Day | 446/113 |
| 1,531,099 | 3/1925 | Hosford | 446/109 |
| 3,153,975 | 10/1964 | Rapata | 24/295 |
| 3,626,634 | 12/1971 | Jones et al. | 446/122 |
| 4,084,720 | 4/1978 | Thurston | 403/242 X |
| 4,389,809 | 6/1983 | Fischer | 446/122 |
| 4,685,892 | 8/1987 | Gould | 446/109 |

*Primary Examiner*—Peter A. Aschenbrenner
*Attorney, Agent, or Firm*—Leitner, Greene & Christensen

[57] ABSTRACT

Disclosed as the present invention is household furniture, particularly furniture which is very easily assembled and disassembled. The present invention is specifically directed to furniture which is scaled in size and in assembly complexity for children. A particular embodiment is disclosed in which the furniture package is provided with full child-size parts and with a smaller sized set of paper or cardboard parts matching the child-size parts, thus enabling the child to visualize the completed furniture pieces as well as the assembly process.

19 Claims, 6 Drawing Sheets

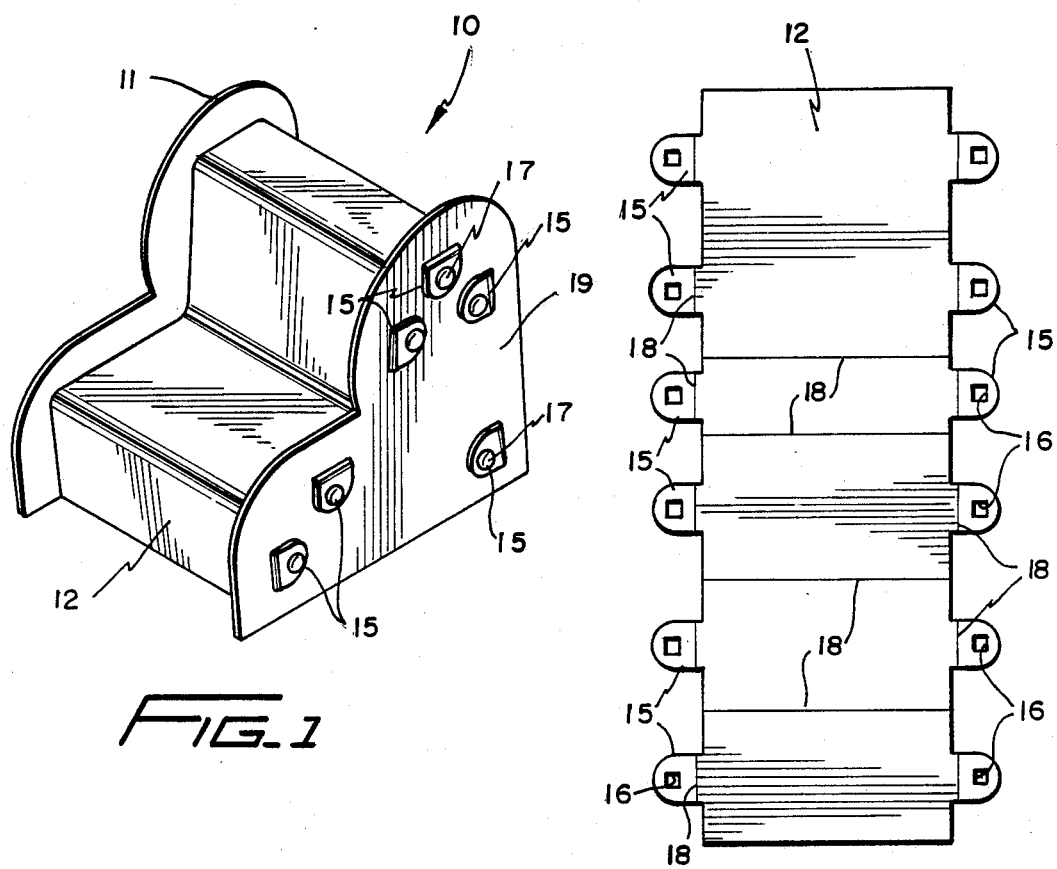
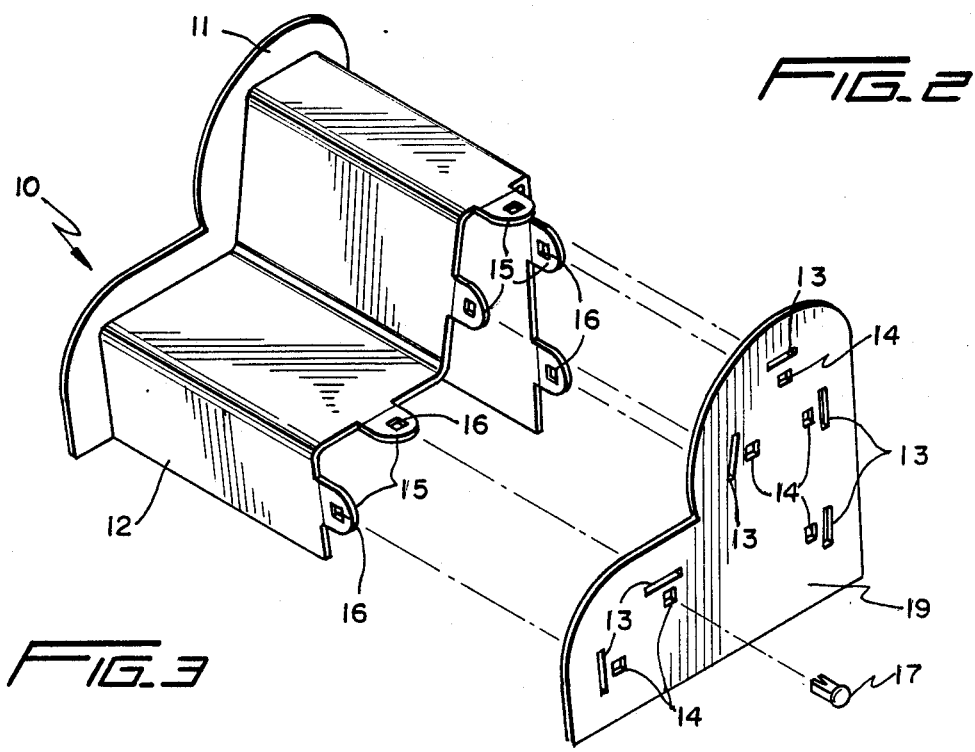

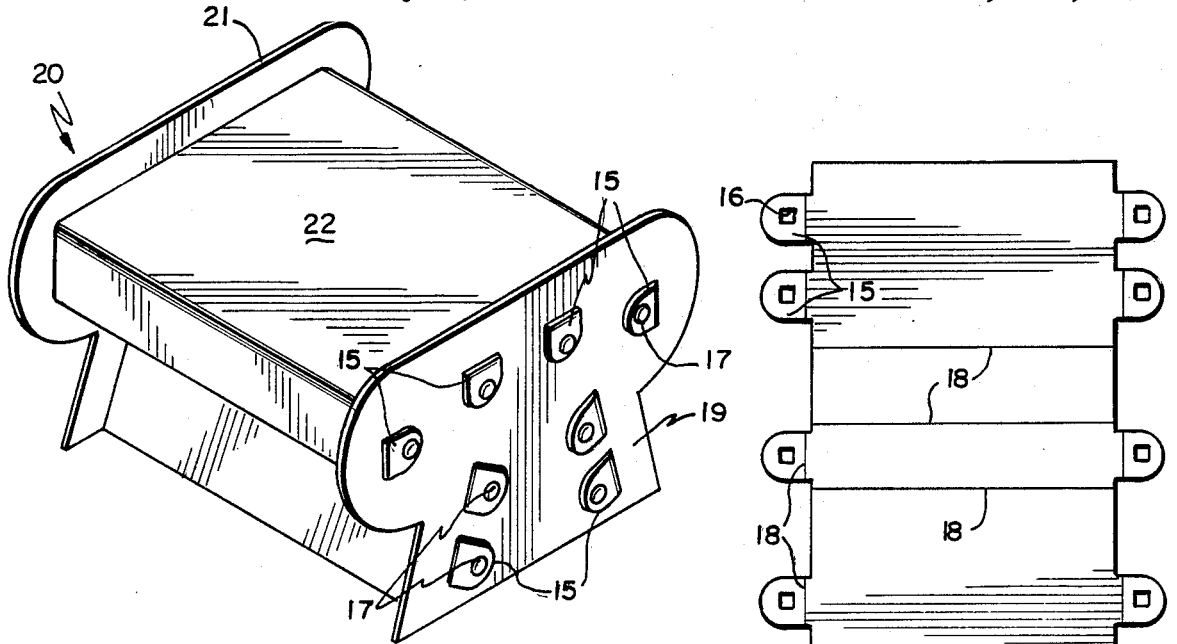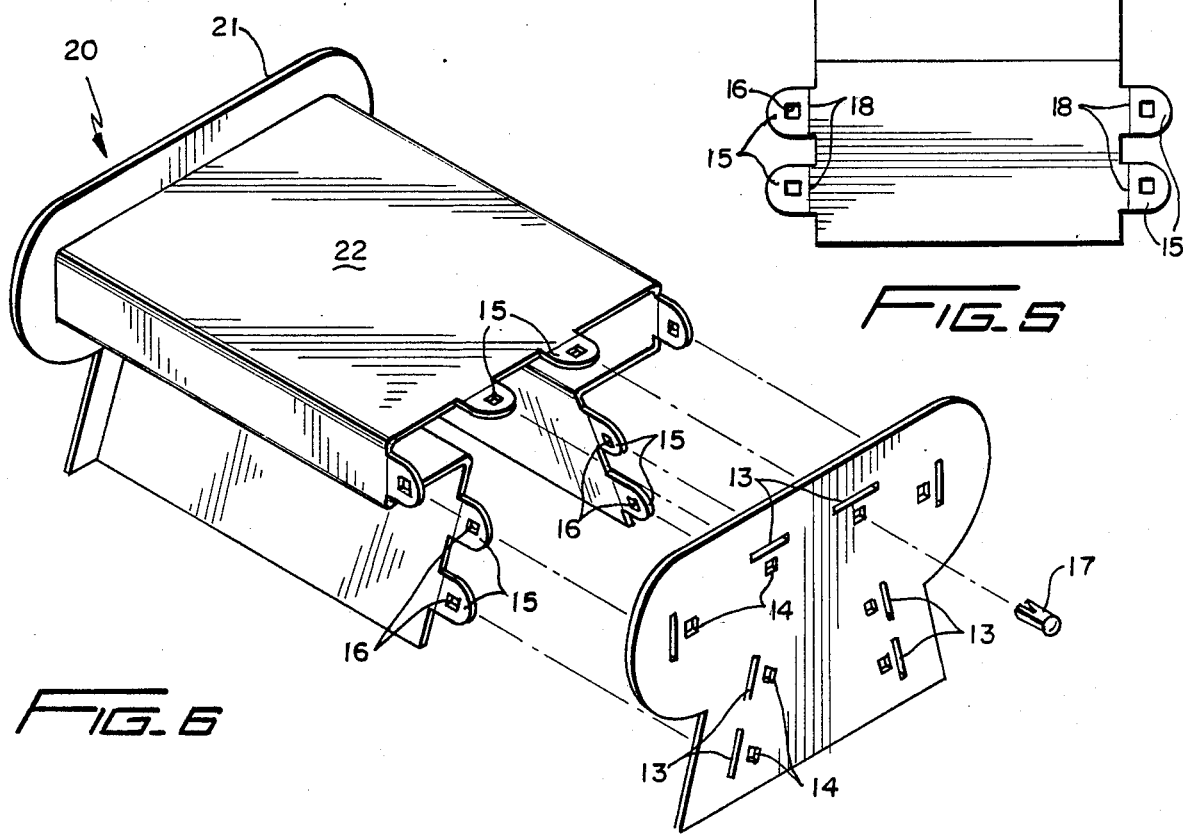

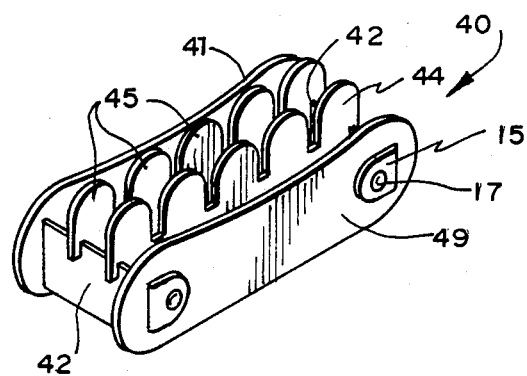
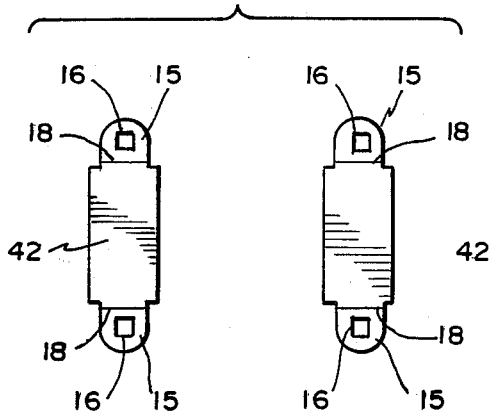
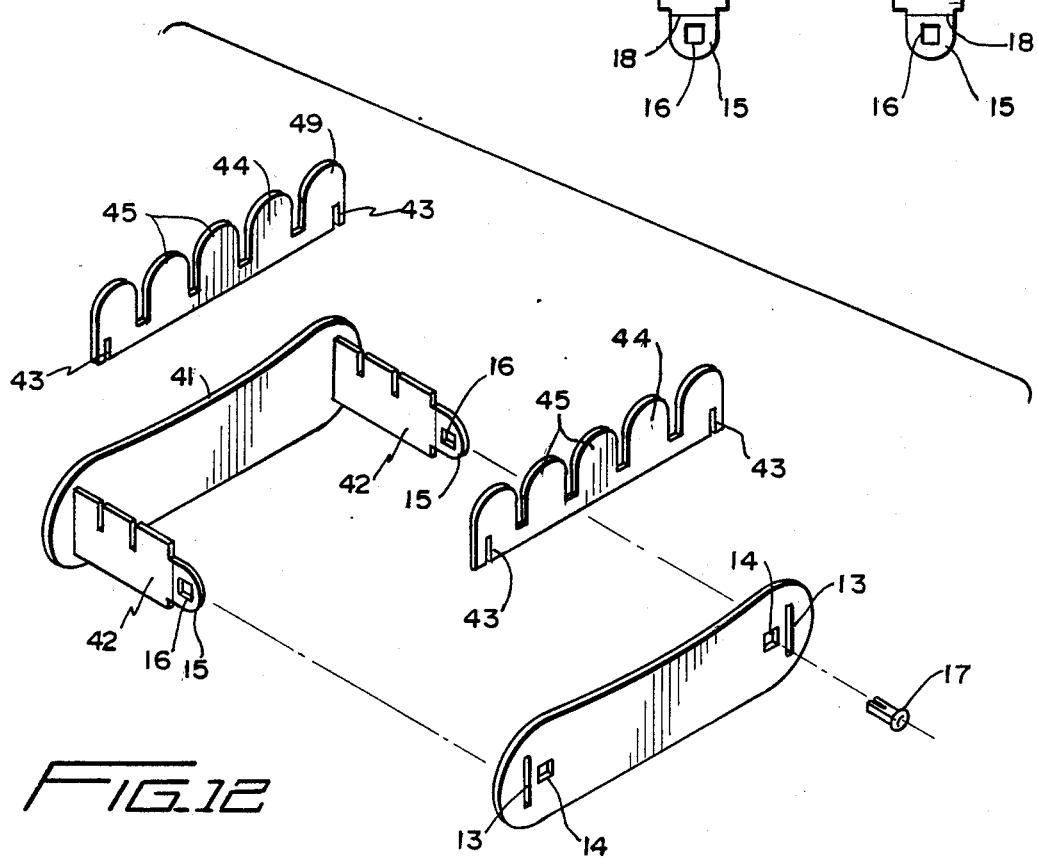

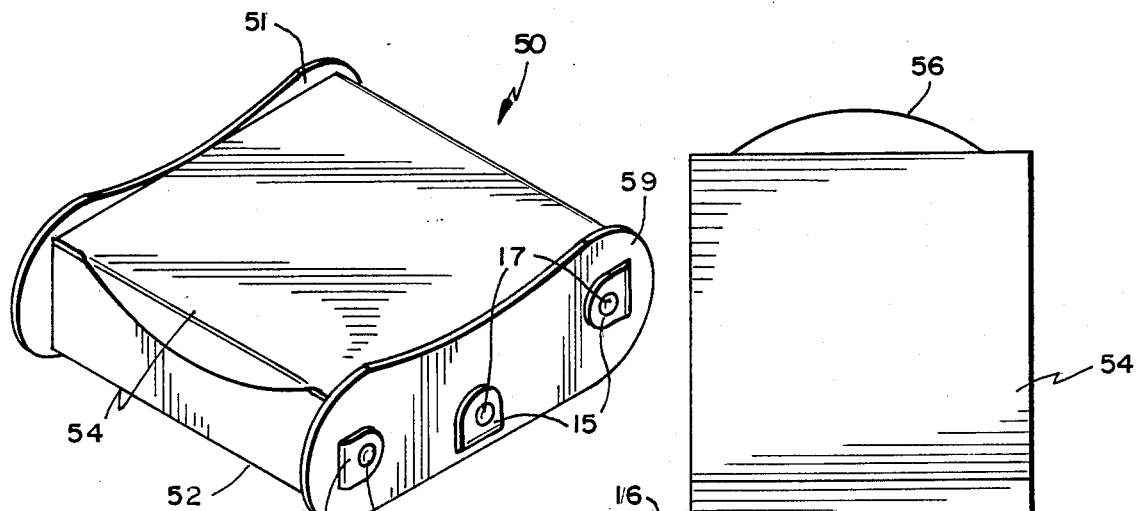
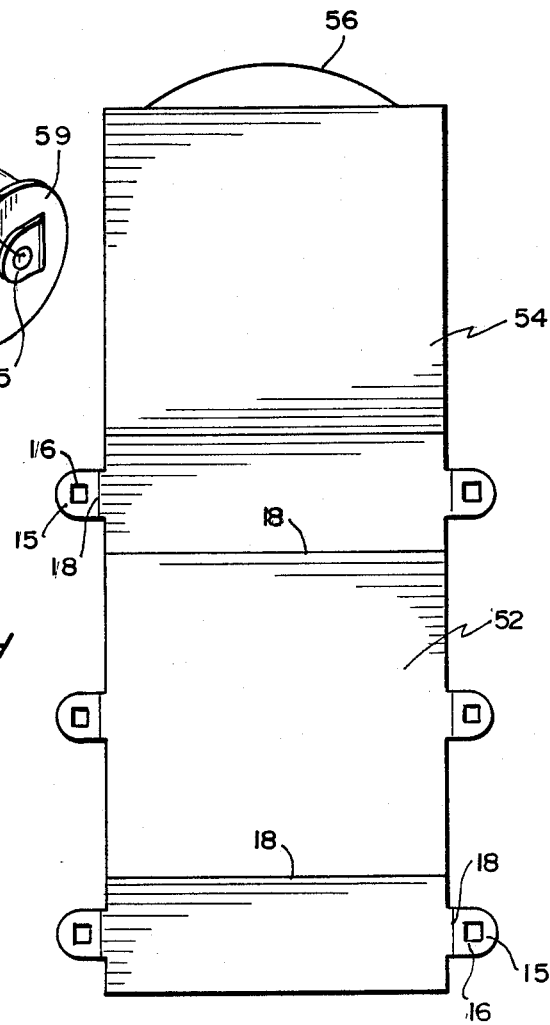
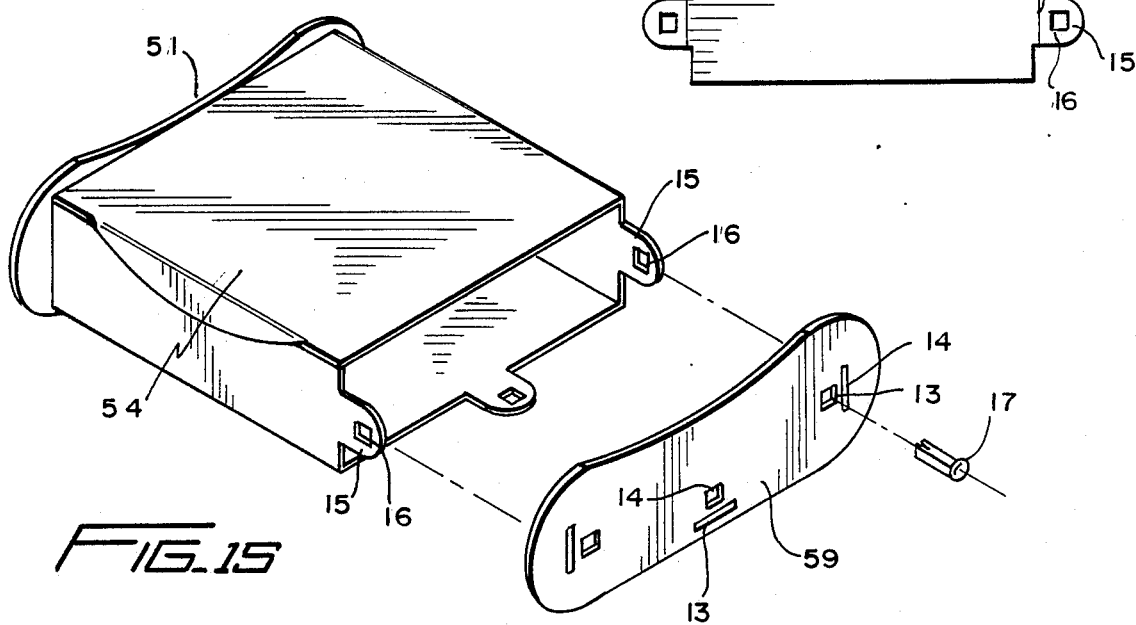

KNOCKDOWN FURNITURE

TECHNICAL FIELD

The present invention relates to household furniture, and more particularly to furniture which is very easily assembled and disassembled. Still more particularly, the present invention relates to furniture scaled in size and in assembly complexity for children. In a particular embodiment, the furniture package is provided with full child-size parts and with a set of paper or cardboard parts matching the child-size parts, thus enabling the child to visualize the completed furniture pieces as well as the assembly process.

BACKGROUND OF THE INVENTION

Household furniture is known from prehistory, as is furniture scaled to size for children. Modern furniture, including furniture for children, includes pieces which may be assembled and disassembled for convenience. Examples of the latter include U.S. Pat. Nos. 3,570,418 to Gooding; 3,467,433 to Lindau et al.; 4,140,065 to Chacon; 3,527,497 to Self; and 1,453,241 to Duffield.

Among these, the Gooding patent discloses tables assembled from a plurality of planar side pieces and horizontal pieces which have tab extensions for mating slots in the side pieces. The assembly is held together by elongated rail members which are threaded at their ends for reception in relatively large knobs, also threaded. The rods also serve to support the horizontal pieces. The Gooding patent does not disclose the incorporation of any foldable or bendable elements; it is noted that the threaded rod and knobs may be difficult for young or handicapped persons to either physically grasp and tighten adequately, or to cognitively grasp the concept of joining by relative rotation to fasten.

Similarly, the other aforementioned patents all disclose the concept of tabbed central pieces mating with slots in side pieces to form disassemblable furniture The Lindau et al. patent discloses "wringing fit pins" as the mechanism for securing the side and central pieces together; in the Chacon patent tapered wedges are force fit into additional slots in the tabs outside the joined side pieces; overhanging lips and pins both are used in the Self patent to secure the elements together; and offset tongue elements are disclosed in the Duffield patent. These offset tongues are not intended to permit substantial flexing. The concept of assembly with "wringing fit pins" of Lindau et al. or wedges, offset tongues and the like is difficult for younger children to recognize; force fitting the "wringing fit pins" and wedges, and likely also the offset tongues is usually beyond the strength of children and perhaps even some adults. The necessary motor skills for aligning a multiplicity of hooked tab members or offset tongues, as in the Chacon, Self and Duffield disclosures, are simply not available to most younger children, as well as provide difficulty for many adults.

The offset tongue elements of the Duffield patent place portions of the central furniture pieces or elements in parallel with and adjacent the vertical side pieces; however, the offset tongues are neither readily foldable by children nor are they adapted for folding, especially by lesser-skilled hands with lower strength. The only fastener mechanism revealed in these disclosures are threaded rods and knobs; fasteners which are easily fixed in place by children are known from U.S. Pat. No. 1,996,722 to Gilbert et al. The fasteners of the latter patent are flanged with expansible resilient projections for insertion in apertures in beams and girders. These fasteners are not contemplated for use with furniture.

None of these disclosures reveal central portion materials which are easily bent or folded by children, yet strong enough to support the weight of a child or accept the misuse frequent among children. None are specially adapted for ready cognition by children of the assembly process.

From the foregoing, it can be seen that there exists in this old and crowded art a need for furniture which is easily assembled and disassembled by children or younger people, and which assembly is also both easily conceptualized and within the motor skills and strength levels of the youthful assemblers.

SUMMARY OF THE INVENTION

The present invention discloses the combination, in knockdown furniture, of side frame members having preformed apertures therein disposed to accept tabbed extensions of central members which may be placed between one or more side members. These central members may be disposed horizontally, vertically, or at angles in between. The side members are preferably generally planar or include at one or more planar surfaces, which are preferably generally vertical. In addition to the side member slots for receiving the central member tabs, the present invention further includes overlying mating apertures in both the tabs and the side members adjacent the slots, for receiving relatively large fasteners which are easily manipulated by younger, weaker and inexperienced hands. It is preferred that these fasteners be easily manipulatable by children; "snap" together fasteners are preferred. The furniture pieces may be supplied in kits or in sets of kits, capable of being assembled into groups of furniture pieces. Bright colors and/or patterns both enhance the attractiveness of the kits to young minds and provide aesthetically pleasing furniture pieces.

In a further embodiment of the present invention, there are combined with the above-described kits or sets of kits simple replicas of the kit or kits, made of paper, cardboard or the like, which are scaled in size to permit assembly of the replicas on a small table or floor area, and which may be assembled in the same manner as the larger-size kits or sets. Patterns in the kits and the replicas may be coordinated with photos includes in instruction sheets to reinforce the assembly instructions.

Where tabs or other elements of the planar materials must be bent or folded, scoring of the material surfaces is used to facilitate manipulation and correct dimensional folding of the elements. It is therefore preferred that the pieces and elements be selected of materials which are both durable and easily manipulated by children, yet remain safe for children and, preferably, be inexpensive.

The furniture of the present invention is intended for being shipped disassembled; the parts readily fold flat, therefore upon disassembly, the components may be again stored flat, in the shipping containers if desired.

It is advantageous according to the present invention that children can make their own furniture with little or no assistance.

It is also an advantage of the present invention that the furniture so built is attractive, sturdy and colorful.

Another advantage of furniture according to the present invention is that such furniture can be easily and readily assembled by children without special tools and with minimal motor and cognitive skills, and minimal strength.

Another advantage of furniture according to the present invention is that such furniture can be easily and readily assembled and then disassembled by children, with minimal assistance or parental supervision.

It is also yet another advantage of the present invention that the furniture can be shipped flat and stored flat after disassembly.

And yet another advantage of the present invention is that the furniture can be manufactured inexpensively from safe materials suitable for children.

DESCRIPTION OF THE DRAWING FIGURES

These and other objects and advantages of the invention as will subsequently become apparent to those of skill in the art reside in the details of assembly and construction as are more fully hereinafter described and claimed, reference being made to the accompanying drawings forming a part of this disclosure, in which like reference numerals refer to like parts and features throughout, and in which:

FIG. 1 is a perspective view of a chair according to the present invention;

FIG. 2 is a planar view of the central element utilized with the chair of FIG. 1;

FIG. 3 is a partially assembled perspective view of the chair of FIG. 1;

FIG. 4 is a perspective view of a table according to the present invention;

FIG. 5 is a planar view of the central element utilized with the table of FIG. 4;

FIG. 6 is a partially assembled perspective view of the table of FIG. 5;

FIG. 10 is a perspective view of a shoe rack according to the present invention;

FIG. 11 is a planar view of the central element utilized with the shoe rack of FIG. 10;

FIG. 12 is a partially assembled perspective view of the shoe rack of FIG. 10;

FIG. 13 is a perspective view of a storage bin according to the present invention;

FIG. 14 is a planar view of the central element utilized with the storage bin of FIG. 13;

FIG. 15 is a partially assembled perspective view of the storage bin of FIG. 13;

DETAILED DESCRIPTION OF THE PREFERRED EMBODIMENTS

Figure 7:
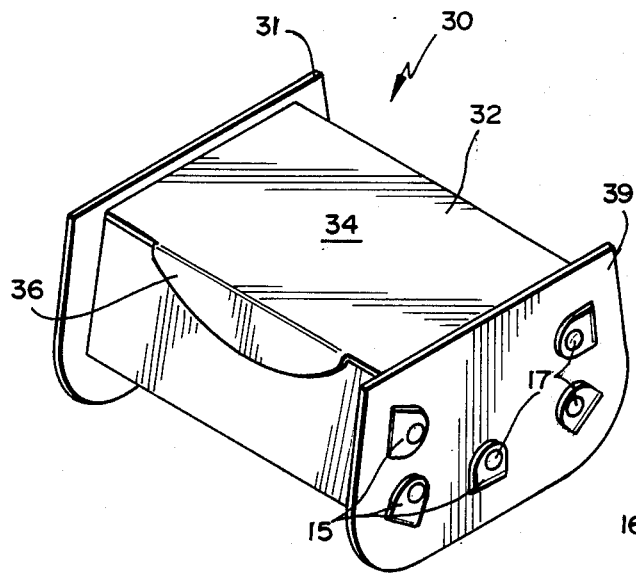
FIG. 7 is a perspective view of a storage box according to the present invention.
Figure 8:
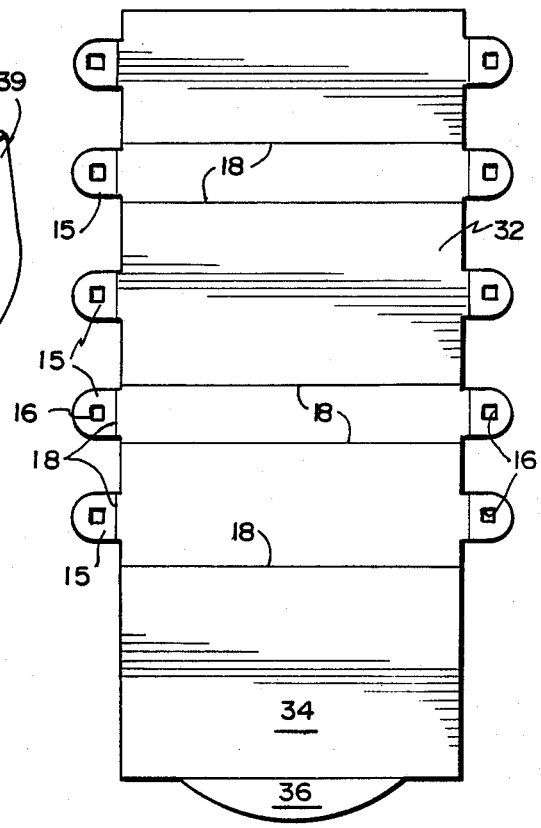
FIG. 8 is a planar view of the central element utilized with the storage box of FIG. 7.
Figure 9:
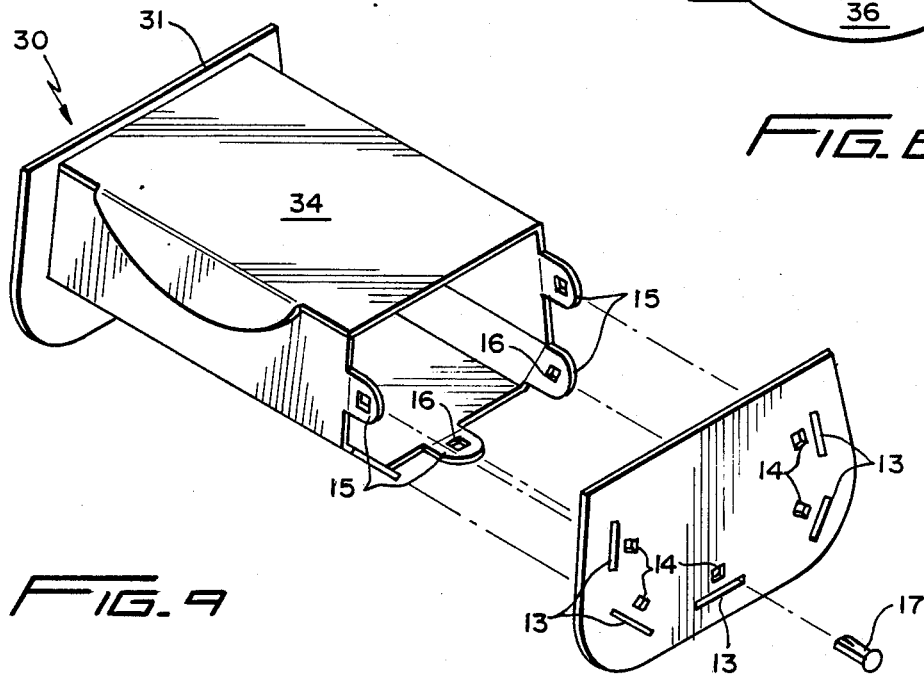
FIG. 9 is a partially assembled perspective view of the storage box of FIG. 7.

The present invention includes a wide variety of furniture pieces, and is illustrated generally in FIGS. 1 through 9. Turning first to FIG. 1, there is illustrated a chair 10 which may be scaled to any suitable size; the decorative shape of chair 10 may be selected according to taste and functional need. For most cases, the furniture pieces will be assembled from generally vertically disposed side or end pieces 11, 19 in combination with one or more central pieces or elements 12. A single planar piece 12, scored for easy bending, is preferred. Side pieces 11, 19 include a plurality of preformed apertures such as slots 13 and fastener holes 14. The central element 12 includes a plurality of protruding flaps or tabs 15, which generally include therein apertures or holes 16 for expansible fasteners 17. Scoring lines 18 may be provided on tabs 15 spaced outward from and parallel to the main body of central element 12 to facilitate bending thereof as will be described hereinafter.

One material from which the side or end pieces 11, 19 as well as central element 12 and fastener 17 may be manufactured is a high-density polymer, such as polypropelene. Material having a thickness of about 3 millimeters or greater (one-eighth inch) and preferably greater than 4 millimeters (one-sixth inch) would be suitable; equivalent suitably strong, light-weight, and flexible planar alternative materials may also be used. The pieces may be cut from sheet stock for inexpensive manufacture. Heat scoring may be used during manufacture to enable bending of the pieces; heat-scoring typically provides a very natural, easily flexed hinge. The fasteners 17 are preferably made sufficiently large that small children cannot swallow them.

For the chair piece shown in FIG. 1, the central element 12 is bent along its longitudinal dimension transverse thereto; a plurality of scoring lines 18 or the equivalent are included to facilitate bending of the central elements 12 to the configuration as shown in FIG. 3.

Assembly proceeds by first forming the central element 12 to the general shape of the chair seat and back portions and inserting the tabs 15 into slots 13 of a first side piece 11 and then repeating the tab 15 insertion procedure for the second side piece 19. Assembly is completed by folding central element 12 tabs 15 over at the site of the mating side piece 11, 19 fastener holes 16, then inserting the expansible fasteners 17 through both tab 15 fastener holes 16 and side pieces 11, 19 fastener holes 14. This procedure is repeated until all of the fastener hole pairs 14, 16 are securing by fasteners 17.

FIG. 4 shows a table 20 according to the present invention. The table pieces are also assembled from generally vertically disposed side or end pieces 21, 29 in combination with central piece or element 22. Side pieces 21, 29 include a plurality of preformed apertures such as slots 13 and fastener holes 14. The table 20 central element 22 includes a plurality of protruding flaps or tabs 15, which generally includes therein apertures or holes 16 for expansible fasteners 17. Scoring lines 18 may be provided on tabs 15 outward from and parallel to the main body of central element 22 to facilitate bending thereof.

For the table shown in FIG. 4, the central element 22 is bent along its longitudinal dimension transverse thereto; a plurality of scoring lines 18 or the equivalent are included to facilitate bending. Assembly of the table proceeds similarly to the chair 10 assembly previously described, by first forming the central element 22 to the general shape of the table top and inserting the tabs 15 into slots 13 of first end piece 21 and then repeating the tab 15 insertion procedure for the end piece 29. Assembly is completed by folding central element 22 tabs 15 over at the site of the mating side piece 21, 29 fastener holes 14, then inserting the expansible fastener 17 through each tab 15 fastener hole 16 and end pieces 21, 29 fastener holes 14.

FIG. 7 shows a storage box 30 according to the present invention. The storage box 30 pieces are also assembled from generally vertically disposed side or end pieces 31, 39 in combination with central piece or element 32. Side pieces 31, 39 include a plurality of preformed apertures such as slots 13 and fastener holes 14. The storage box 30 central element 22 includes a plurality of protruding flaps or tabs 15, which generally include therein apertures or holes 16 for expansible fasteners 17. Scoring lines 18 may be provided on tabs 15 outward from and parallel to the main body of central element 32 to facilitate bending thereof.

For the storage box 30 shown in FIG. 7, the central element 32 is bent along its longitudinal dimension transverse thereto; a plurality of scoring lines 18 or the equivalent are included to facilitate bending. Assembly of the storage box 30 proceeds similarly to the chair 10 assembly previously described, by first forming the central element 32 to the general shape of the storage box 30 and inserting the tabs 15 into slots 13 of a first storage box 30 end piece 31 and then repeating the tab 15 insertion procedure for the end piece 39. Assembly is completed by folding each of central element (storage box 30 top, bottom, front and back portions) 32 tabs 15 over at the site of the mating side piece 31, 39 fastener holes 16, then inserting the expansible fastener 17 through both tab 15 fastener holes 16 and end piece 31, 39 fastener holes 14. The lid portion 34 with flap 36 does not include any tabs 15 so that the lid portion 34 may be raised to access the interior of the storage box 30.

FIG. 10 shows a shoe rack 40 according to the present invention. The shoe rack 40 is also assembled from generally vertically disposed side or end pieces 41, 49 in combination with a plurality of generally horizontally spaced central pieces or elements 42. Additional, a pair of intermediate pieces 44 are secured to the central elements 42, which serve as the holders for the shoes. Intermediate pieces 44 preferably include a plurality of upward-projecting protrusions 45, which may be rounded at their tops and sized according to need, for supporting a plurality of shoes (not shown). End pieces 41, 49 include a plurality of preformed apertures such as slots 13 and fastener holes 14. The shoe rack 40 central elements 42 include a plurality of protruding flaps or tabs 15, which generally include therein apertures or holes 16 for expansible fasteners 17. Intermediate pieces 49 may be secured to both of the central pieces 42 by interlocking each central piece 42 with a slit 43 in each end of an intermediate piece 49.

Assembly of the shoe rack 40 proceeds similarly to the chair 10 assembly previously described, except the central elements 42 do not require any bending and they are assembled to the end pieces 41, 49 by inserting the tabs 15 into slots 13 of first shoe rack 40 end piece 41 and then repeating the tab 15 insertion procedure for the end piece 49. Assembly of the side pieces 41, 49, and central elements 42 is completed by folding shoe rack 40 central element 42 tabs 15 over at the site of the mating side piece 41, 49 fastener holes 16, then inserting expansible fasteners 17 through both tab 15 fastener holes 16 and end piece 41, 49 fastener holes 14. The intermediate pieces 49 are then positioned on the central elements 42.

FIG. 13 shows a storage bin 50 according to the present invention. The storage bin 50 is also assembled from generally vertically disposed side or end pieces 51, 59 in combination with central piece or element 52. Side pieces 51, 59 include a plurality of preformed apertures such as slots 13 and fastener holes 14. The storage bin 50 central element 52 includes a plurality of protruding flaps or tabs 15, which generally include therein apertures or holes 16 for expansible fasteners 17. Scoring lines 18 may be provided on tabs 15 outward from and parallel to the main body of central element 52 to facilitate bending thereof.

For the storage bin 50 shown in FIG. 13, the central element 52 is bent along its longitudinal dimension transverse thereto; a plurality of scoring lines 18 or the equivalent are included to facilitate bending. Assembly of the storage bin 50 proceeds similarly to the chair 10 assembly previously described, by first forming the central element 52 to the general shape of the storage bin 50 and inserting the tabs 15 into slots 13 of a first storage bin end piece 51 and then repeating the tab 15 insertion procedure for the end piece 59. Assembly is completed by forming storage bin 50 central element (top and side portions) 52 tabs 15 over at the site of the mating end piece 51, 59 fastener holes 16, then inserting the expansible fasteners 17 through both tab 16 fastener holes 16 and end piece 51, 59 fastener holes 14. The lid portion 54 with flap 56 does not include any tabs 15 so that the lid portion 54 may be raised to access the interior of the storage bin 50.

Figure 16:
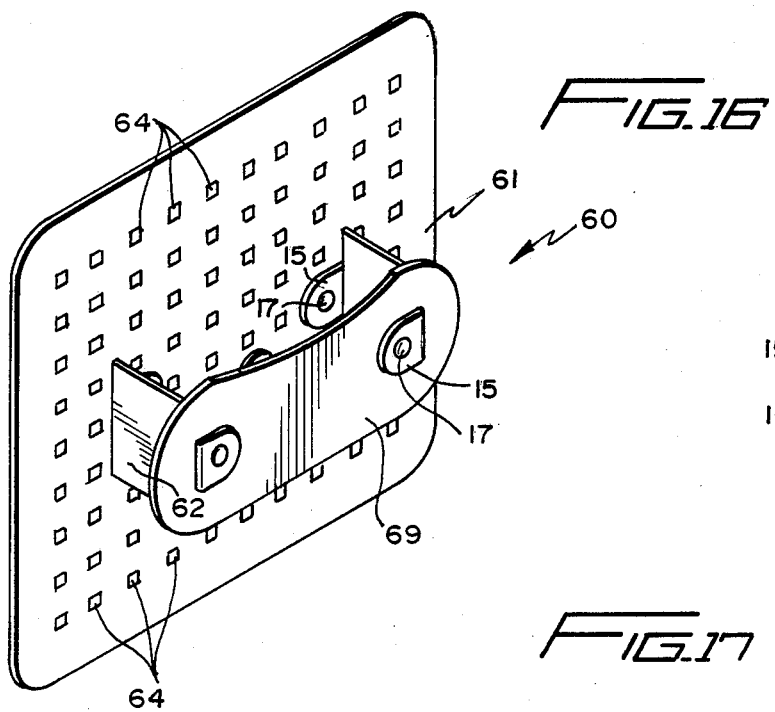
FIG. 16 is a perspective view of a storage board according to the present invention.
Figure 17:
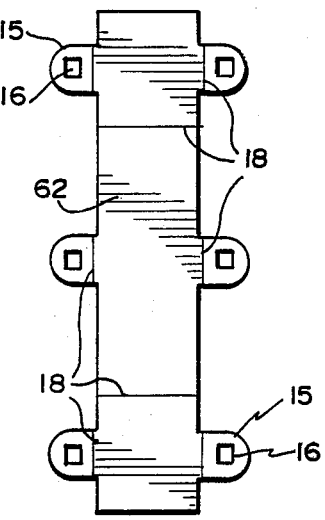
FIG. 17 is a planar view of the central element utilized with the storage board of FIG. 16.
Figure 18:
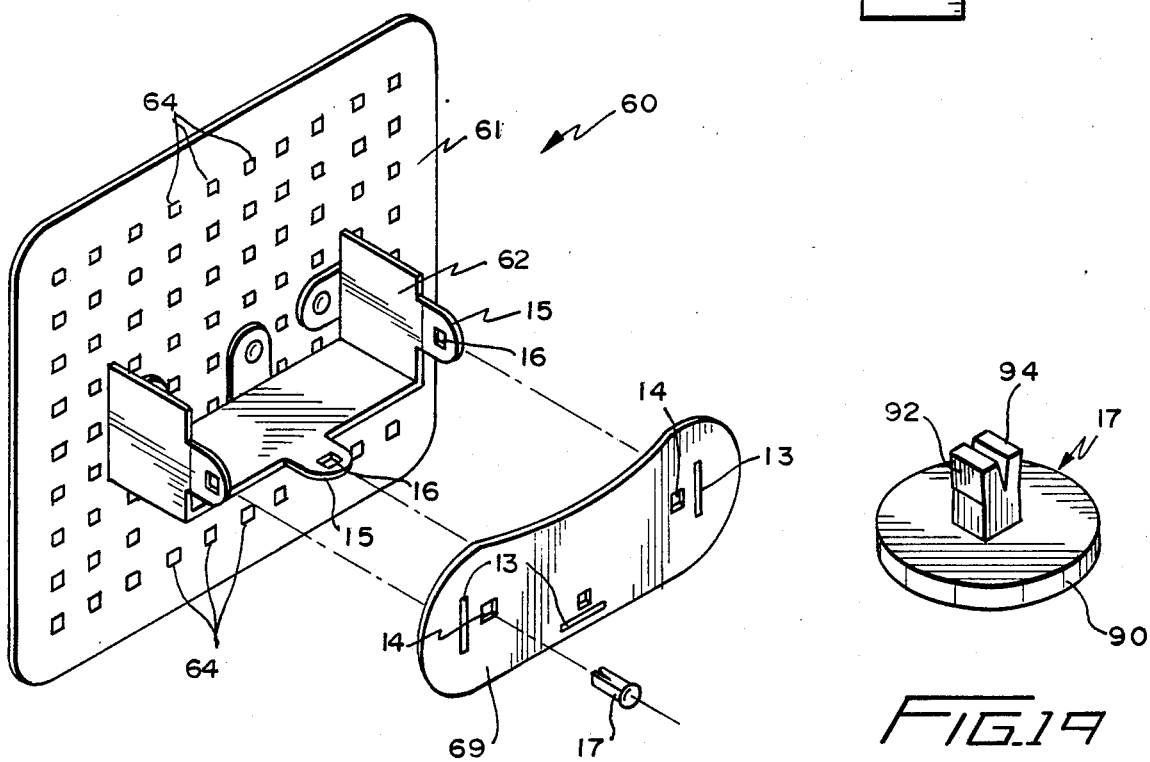
FIG. 18 is a partially assembled perspective view of the storage board of FIG. 16.

FIG. 16 shows a storage board 60 according to the present invention. The storage board 60 includes a back end piece 61 adapted to be mounted on a wall. The back piece 61 includes rows of openings 64 which correspond in size to the openings 14 of the above described furniture embodiments. The openings 64 are utilized to support a central piece or element 62 which when folded, as seen in FIG. 18, forms a shelf. The openings 64 may also be used for receiving hooks, picture holders and other items that are designed to be used with pegboard.

The storage board central element 62 includes a plurality of protruding flaps or tabs 15, which generally includes therein apertures or holes 16 for expansible fasteners 17. Scoring lines 18 may be provided on tabs 15 outward from and parallel to the main body of central element 72 to facilitate bending thereof. A plurality of central elements 62 may be used to provide additional shelves as required. An end front piece 69 is provided to complete each shelf portion of the storage board.

For the storage board 60, the central element 62 is bent along its longitudinal dimension transverse thereto; a plurality of scoring lines 18 or the equivalent are intended to facilitate bending. Assembly of the storage board 60 proceeds similarly to the chair 10 assembly previously described. It should be noted that back end piece 61 does not include any slots 13 to receive the tab 15 of central element 62. Thus, as seen best in FIG. 18, after the central element is bent to the proper shape, the tabs 15 adjacent back end piece 61 are folded against back end piece 61 and expansible fasteners 17 are inserted through both tab 15 fastener holes 16 and back end piece openings 64. The shelf is then completed by mounting end front piece 69 onto central element 62 with the tabs 15 entering through the slots 13 and then inserting expansible fasteners 17 through both tab 15 fastener holes 16 and end front piece 69 fastener holes 14.

Figure 19:
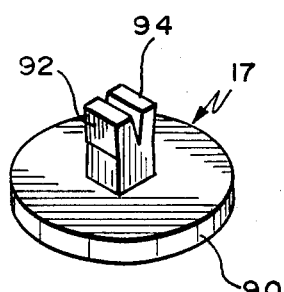
FIG. 19 is a perspective of a fastener suitable for assembly of furniture pieces or elements according to the present invention.

FIG. 19 shows an exemplary expansible fastener 17 for use with the present invention, comprising generally a first part in the shape of a head or flange 90, having extended therefrom a radially expansible central protrusion 92. The central protrusion 92 is split into at least two sections to form a resilient end portion 94. A taper may be provided on the end portion 94 to faciliitate placement of the fastener 17 into the openings 14 of the end pieces and openings 16 of the tabs 15. Although the flange 90 and the central protrusion 92 are shown as circular and rectangular respectively, it should be obvious that each part may be of different geometric shapes. Of course, the openings 14, 16 and 64 will need to conform in usage to the shape of central protrusion 92. The flange 90 can be made of any geometric shape and can be of various thicknesses and widths depending primarily on the aesthetic effect desired.

The above described furniture embodiments can be made in various sizes to accomodate different children's sizes. Colors of each of the three primary components (the end pieces, the central elements and the fasteners) can be different or the same depending on the whim of the purchaser. The furniture embodiments can be sold with a miniature cardboard version so that the children can initially assemble a smaller version of the furniture. The cardboard furniture can then be used as a toy.

It will thus be seen that the objects set forth above are efficiently attained and since certain changes may be made in the above embodiments without departing from the scope of the invention, it is intended that all matter contained in the above description shall be interpreted as illustrative and not in a limiting sense.

I claim:

1. Furniture which may be assembled and readily disassembled, comprising:
   (a) at least one generally planar central member, having extended from edges thereof a plurality of tab members each having therein an aperture;
   (b) at least one generally planar side member, having therethough a plurality of elongated slot-like first apertures for receiving said tab members, and a plurality of adjacent second apertures substantially matching said tab member apertures; and
   (c) expansible fastener means for securing said tab members to said side members by inserting said fastener means through said tab apertures and said second apertures.

2. Apparatus as in claim 1, wherein said central member tab members are scored along a line parallel to the central member and spaced apart therefrom by the thickness dimension of the side member.

3. Apparatus as in claim 1, wherein said expansible fastener means, said planar side members, and said central members snap together.

4. Apparatus as in claim 1, wherein said planar members are made of high-density plastic.

5. Apparatus as in claim 1, wherein said planar members are at least 3 millimeters thick.

6. Apparatus as in claim 1, wherein said planar central members are bendable, and further include scoring lines to facilitate bending along predetermined lines.

7. Apparatus as in claim 1, wherein at least one of said planar side members is multiply perforated to enable suspension of items therefrom.

8. Children's furniture which may be assembled and readily disassembled, comprising:
   (a) at least one generally planar high-density plastic central member, having extended from edges thereof a plurality of tab members each having therein an aperture;
   (b) at least one generally planar high-density plastic side member, having therethough a plurality of elongated slot-like first apertures for receiving said tab members, and a plurality of adjacent second apertures substantially matching said tab member apertures; and
   (c) expansible high-density plastic fastener means for securing said tab members to said side members by inserting said fastener means through said tab apertures and said second apertures.

9. Apparatus as in claim 8, wherein said central member tab members are scored along a line parallel to the central member and spaced apart therefrom by the thickness dimension of the side member.

10. Apparatus as in claim 8, wherein said expansible fastener means, said planar side members, and said central members snap together.

11. Apparatus as in claim 8, wherein said planar side members are at least 3 millimeters thick.

12. Apparatus as in claim 8, wherein said planar central members are bendable, and further include scoring lines to facilitate bending along predetermined lines.

13. Apparatus as in claim 8, wherein at least one of said planar side members is multiply perforated to enable suspension of items therefrom.

14. In combination, children's furniture which may be easily assembled and readily disassembled, comprising:
   (a) a first set of children's smaller scale furniture, including
      (i) at least one generally planar central member, having extended from edges thereof a plurality of tab members each having therein an aperture,
      (ii) at least one generally planar side member, having therethough a plurality of elongated slot-like first apertures for receiving said tab members and a plurality of adjacent second apertures substantially matching said tab member apertures, and
      (iii) expansible fastener means for securing said tab members to said side members by inserting said fastener means through said tab apertures and said second apertures, and
   (b) a second set of replica model scale children's furniture made of thin material easily cut by scissors, including
      (i) at least one generally planar central member, having extended from edges thereof a plurality of tab members each having therein an aperture
      (ii) at least one generally planar side member, having therethough a plurality of elongated slot-like first apertures for receiving said tab members and a plurality of adjacent second apertures substantially matching said second apertures, and
      (iii) expansible fastener means for securing said tab members to said side members by inserting said fastener means through said tab apertures and said second apertures.

15. Apparatus as in claim 14, wherein said first group includes central member tab members which are scored along a line parallel to the central member and spaced apart therefrom by the thickness dimension of the side member.

16. Apparatus as in claim 14, wherein said expansible fastener means, said planar side members, and said central members snap together.

17. Apparatus as in claim 14, wherein said planar side members are at least 3 millimeters thick.

18. Apparatus as in claim 14, wherein said planar central members of both the first set and the second set are bendable, and further include scoring lines to facilitate bending along predetermined lines.

19. Apparatus as in claim 14, wherein at least one of said planar side members is multiply perforated to enable suspending items therefrom.

* * * * *